Feb. 3, 1953  M. E. WILKE  2,627,532
ELECTRIC BATTERY WITH CROSS-OVER INTERCELL CONNECTORS
Filed Feb. 15, 1948  2 SHEETS—SHEET 1
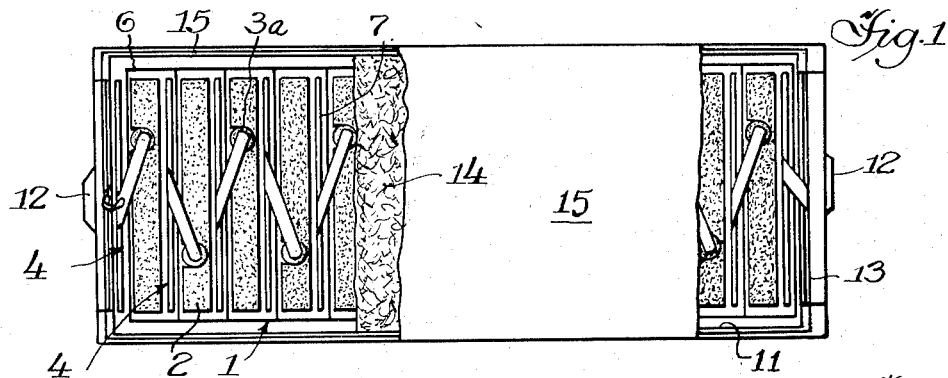
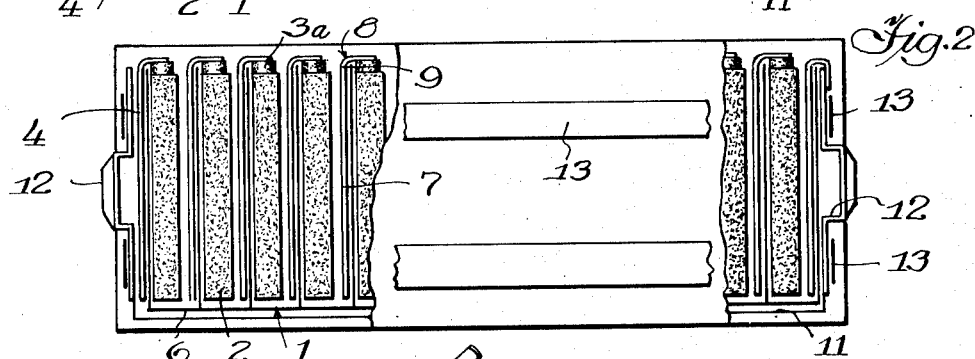
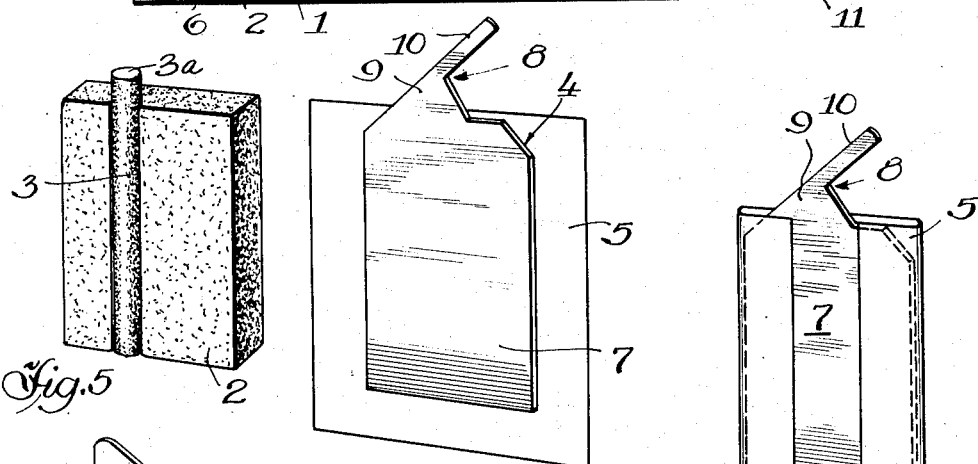
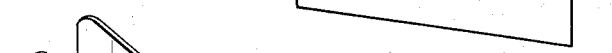
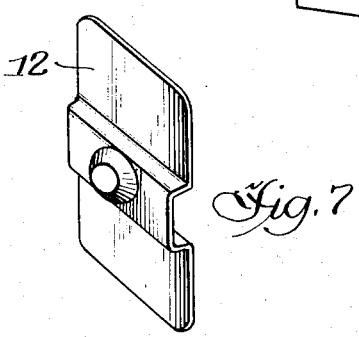
INVENTOR.
Milton E. Wilke
BY
Tesch and Darbo Attys.

Feb. 3, 1953 M. E. WILKE 2,627,532
ELECTRIC BATTERY WITH CROSS-OVER INTERCELL CONNECTORS
Filed Feb. 15, 1948 2 SHEETS—SHEET 2

INVENTOR.
Milton E. Wilke
BY
Tesch and Darbo Attys

Patented Feb. 3, 1953

2,627,532

UNITED STATES PATENT OFFICE 2,627,532

ELECTRIC BATTERY WITH CROSS-OVER INTERCELL CONNECTORS

Milton Edward Wilke, Freeport, Ill., assignor, by mesne assignments, to Burgess Battery Company, Freeport, Ill., a corporation of Delaware Application February 5, 1948, Serial No. 6,425

10 Claims. (Cl. 136—111)

This invention relates to electric dry cell batteries and more especially to a particular arrangement and structure for connecting in series a plurality of dry cells of the flat type.

The principal object of the invention is to provide a battery of this type wherein the cell terminals are physically separated sufficiently to permit the complete engulfing of all terminal elements by the battery sealing material whereby the battery seal is improved. A further advantage of the increased spacing of terminal elements resides in the more certain avoidance of short circuits within the battery caused by physical contact of the terminal elements. A further object of the invention is to provide a battery structure in which the several cells may be more conveniently connected with resulting cost advantages. Another object is to provide a novel form of negative electrode and terminal plate adapted for use in the novel battery construction and contributing to the stated objects and advantages of the invention.

In the accompanying drawings:

Fig. 1 is a diagrammatic top view of a battery embodying the invention;

Fig. 2 is a diagrammatic side elevational view of the battery of Fig. 1;

Fig. 3 is a perspective view of one form of negative electrode and terminal plate with a separator element prior to application of the latter;

Fig. 4 is a perspective view of the negative electrode and terminal plate and separator assembly;

Fig. 5 is a perspective view of a mix block and carbon rod positive electrode and terminal assembly;

Fig. 7 is a perspective view of an electrode and terminal plate for the battery of Fig. 1;

Figure 6:
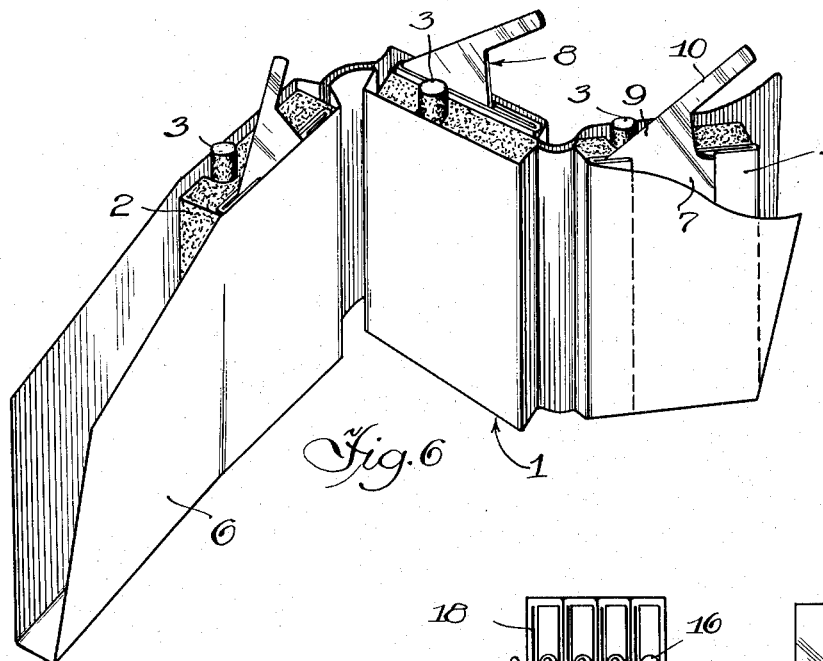
Fig. 6 is a perspective view of a group of cells in process of manufacture.
Figure 12:
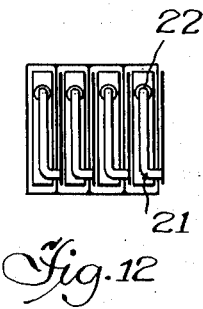

Figs. 8, 10, 12, and 14 are diagrammatic top views of alternative battery structures embodying the invention; and Figs. 9, 11, 13, and 15 are front views of the negative electrode and terminal plates employed in the batteries of Figs. 8, 10, 12, and 14, respectively.

The development in recent years of portable battery-powered equipment, such as portable radio receivers and hearing aid devices, has given impetus to the improvement of the output capacity per unit of battery volume and to the general scaling down of all battery dimensions to reduce the weight and space requirements. This has encouraged the use of flat cells rather than the space extravagant round cells more generally used in earlier "B" batteries. Where the several cells of the battery are electrically connected by means of terminals exposed on one side thereof, the crowding of the cell terminals as the cells are miniaturized renders more difficult the soldering and other intercell connecting operations and gives rise to new problems in properly sealing the cells and battery. The present invention is directed to the alleviation of these particular problems.

In carrying out the invention, the cells and terminals thereof are so arranged in the battery block that the intercell connectors extend sidewise as well as lengthwise between the terminals to be connected. In this arrangement, the cell terminals and intercell connectors are spaced further apart to permit more room for the operator to work in connecting the cells and avoid narrow interspaces into which the sealing material will not flow.

The invention is exemplified in a battery diagrammatically illustrated in Figs. 1 and 2 and composed of a series of juxtaposed flat cells 1 of the Leclanche type. The principal elements of these cells are mix blocks or cakes 2, shown separately in Fig. 5, carbon rod electrodes 3 embedded in mix cakes 2 and having terminal portions 3a projecting above the top side of the mix cake, zinc negative electrode plates 4, illustrated separately in Fig. 3 and each having a covering on its inner face of paper or other bibulous material 5, as illustrated in Fig. 4, and envelopes 6 of a suitable film material resistant to battery liquids, such as a rubber hydrochloride composition sold under the name "Pliofilm." The composition and general specifications of these several cell elements are well known and understood and will not be described in detail herein except to the extent necessary to a thorough understanding of the invention.

With the exception of the metallic electrode plate 4, all cell and battery elements employed in the battery of Figs. 1 and 2 are standard parts. Plate 4 is composed of two parts; namely, a rectangular body portion 7 which serves as the active negative electrode of the cell and a terminal lug 8 integral with the body plate 7 and projecting from the top side, as illustrated. The terminal portion 8 of plate 4 may also be considered to have two parts; namely, a relatively inflexible broad base portion 9 and a narrower flexible extremity 10 extending outwardly from plate 4 and terminal base 9. The functions of these two parts of terminal lug 8 will be described presently.

For clarity of description and for the purposes of the claims, the term "electrode" shall be employed to refer to the principal body portions of the carbon and zinc elements of the cells, which portions are largely encompassed within the cells, and the term "terminal" is used in its more restrictive sense to refer to those elements of each cell to which electrical connection is physically made.

In manufacturing the cells for the battery, the paper separators 5 are applied to plates 4 by folding the side marginal portions around the side edges of the electrode portions of the plates and then folding the bottom portion of the paper (shown in dotted lines in Fig. 4) under along the bottom edges of plates 4. Although it is strictly necessary only to cover the inner face of electrode portion 7 of plate 4 to separate the same from mix cake 2 in the cell, it is desirable to cover the edges of the plate and extend the lower portion of the separator, as shown, to prevent short circuiting of the cell by contact of the mix with the electrode. The mix cake 2, generally formed by extruding and cutting to size, may then be laid in position upon paper separator 5. Carbon rod electrode 3 is laid upon the face of the mix cake opposite from the negative electrode plate and pressed into the cake. The carbon electrode may be placed in the cake prior to bringing the latter together with the negative electrode assembly, if desired. Carbon electrode 3 may be triangular in cross section, if desired, to lay flat and flush with the surface of the mix cake.

Each individual cell so assembled is then wrapped in an envelope 6 which is entirely closed except at the top of the cell. The cells may be individually wrapped or they may be individually sealed in a continuous band of the film material, as illustrated in Fig. 6. This convenient method of packaging the individual cells is known and in regular commercial use and is therefore not described in further detail herein.

It will be noted that terminal lug 8 is not located at the middle of the top side of plate 4, but rises from one side of the top of this plate. This leaves an open area above the top of the electrode portion 7 at the opposite end of the top of plate 4. The significance of this open area will be apparent as the sealing operation is described. In applying the separators 5 to the plates 4, the faces of a given side of half of the plates are covered to form right hand electrode terminal assemblies and the faces of the opposite side of the remaining plates are covered to form left hand electrode terminal assemblies.

In assembling the cells, the carbon electrode 3 is also disposed on one side of the middle of mix cake 2. As shown in Fig. 6, the positive and negative terminals of each cell are located on the same side of the cell and at the opposed faces thereof. The zinc plate 4 forms one face of the cell and the carbon electrode 3 is embedded in mix cake 2 at the opposite face or surface of the cell.

In grouping the cells to form the battery, they are so arranged that the terminals of alternate cells of the series are disposed on one side of the middle of the cells and the terminals of the remaining alternate cells are disposed on the other side of the middle thereof. In other words, the cells are arranged in a juxtaposed series with alternating right and left hand terminal assemblies resulting in a zig-zag disposition of the series of terminals (see Fig. 1). The terminals of adjoining cells to be electrically connected are spaced laterally as well as longitudinally in the battery block. The desired number of cells are placed in an inner battery box 11 of cardboard impregnated with wax or resin. The flexible extremities 10 of terminal lugs 8 are then bent outwardly from the cell of which it is a part to extend crosswise or sidewise as well as lengthwise of the battery to engage the positive terminal of the adjoining cell. The length and direction of projection of the flexible extremity 10 from lug base 9 or plate 4 before bending is such that the end of the flexible strip rests upon the positive terminal of the adjoining cell when the strip is bent as described. The less flexible base portions 9 of the lugs serve to space the intercell connector strips above the tops of the cells at approximately the height of the carbon terminals. The intercell connections may be completed by soldering the strips 10 to the connecting terminal or by otherwise permanently completing the electrical connection. The appearance of the top of the battery block, so connected, is shown in Fig. 1.

Suitable battery terminals, such as brass plates 12, may then be electrically connected by suitable means with the end terminals of the cell block, the entire assembly bound together by straps 13, and a seal 14 applied to the top of the cell block by pouring a thermoplastic sealing material in molten form upon the tops of the cells. The battery unit may then be inserted in a suitable outer carton 15.

It will be appreciated that this arrangement of cell terminals avoids narrow interspaces at the tops of the cells which might cause imperfect sealing. The terminals of each cell are spaced by a substantial thickness of mix as well as by separator 5. The positive terminals are not opposite the negative terminals of adjoining cells, but project from the tops of the cells opposite the cut-out areas of the negative electrode and terminal plates of the adjoining cells. Thus, clear spaces are provided around both positive and negative terminals for the sealing material.

Many alternative forms of structure may be employed in carrying out the principle of this invention. For example, it is not necessary to arrange the terminals so that the intercell connectors are criss-crossed (see Fig. 1), nor is it necessary to locate the carbon terminals on one side of the cells. In the battery illustrated in Fig. 8, carbon terminals 16 are disposed midway between the two sides of the cells and intercell connector strips 17 extend from terminals at one side of the tops of negative electrode plates 18 and cross over to the positive terminals in connecting the cells together. The shape of a suitable negative electrode and terminal plate for this battery is illustrated in Fig. 9. All of the cells of this battery are identical.

Figure 8:
Figure 9:
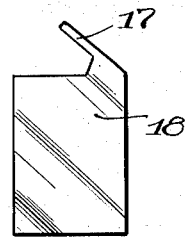
Figure 10:
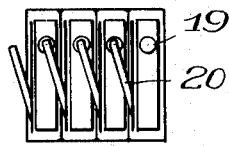
Figure 11:
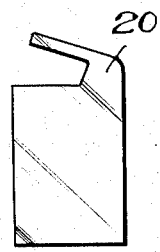
Figure 14:
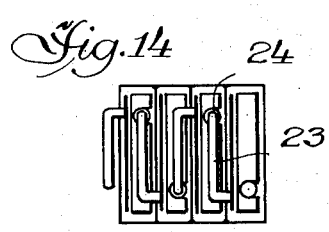

The battery illustrated in Fig. 10 is similar to that shown in Fig. 8, except that positive terminals 19 are located on one side of the middle of the cells and negative terminals 20 are disposed on the opposite side. The choice between the structures of Figs. 8 and 10 depends upon the widths of the cells used and possibly other considerations. The shape of the negative electrode and terminal plate for the battery of Fig. 10 is illustrated in Fig. 11.

Figure 13:
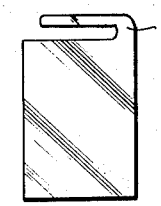
Figure 15:

Although in all embodiments of the invention, the intercell connectors extend sidewise or crosswise of the battery, as well as a sufficient distance lengthwise to reach the terminals of adjoining cells, the structure is not limited to one in which the connectors reach diagonally in approximately straight lines between the connected terminals. In the batteries illustrated in Figs. 12 and 14, intercell connectors 21 and 23 extend crosswise from positive cell terminals 22 and 24, respectively, to points approximately opposite the negative terminals respectively connected therewith and then to the negative terminals in a direction lengthwise of the battery. Suitable electrode and terminal plates are shown in Figs. 13 and 15.

Although the invention enjoys its greatest utility when intercell connector strips integral with the negative electrode terminal plates are used, separate wire or cable connectors may be employed. The invention is applicable to all batteries in which the terminals of adjoining cells are only narrowly separated, such as in batteries having cells comprising two sheet form or metallic foil electrodes.

Invention is claimed as follows:

1. A battery comprising a series of juxtaposed flat cells, each cell having a sheet-form metallic negative electrode member arranged at one face of said cell, each cell having a positive terminal and a negative terminal extending to the top of said battery, intercell connectors electrically connecting the opposite terminals of adjoining cells, each said negative terminal and intercell connector being an extension of said sheet-form negative member, sealing material engulfing said terminals and connectors, the connected terminals of adjoining cells being laterally and longitudinally spaced from each other to permit ready access of said sealing material between said terminals.

2. A battery in accordance with claim 1 wherein said intercell connectors extend diagonally between the terminals connected thereby.

3. A battery in accordance with claim 1 wherein each intercell connector extends laterally from a positive terminal to a point approximately opposite the adjacent negative terminal connected therewith and thence to said negative terminal.

4. A battery in accordance with claim 1 wherein the positive terminals of alternate cells in said series are disposed on one side of the middle and the positive terminals of the remaining alternate cells are disposed on the other side of the middle thereof and each intercell connector extends laterally from a positive terminal to a point approximately opposite the adjacent negative terminal connected therewith and thence to said negative terminal.

5. A battery comprising a series of juxtaposed flat cells, each cell having a metallic terminal and a carbon rod terminal both projecting above said cell, intercell connectors electrically connecting said cells in series, both terminals in alternate cells in said series being disposed on one side of the middle and both terminals of the remaining alternate cells being disposed on the other side of the middle thereof, the arrangement being such that terminals of adjacent cells connected by said connectors are spaced laterally as well as longitudinally of said battery to provide access to battery sealing material between said terminals.

6. A battery comprising a series of juxtaposed flat cells each having a positive terminal and a negative terminal both extending to the top thereof, intercell connectors electrically connecting the opposite terminals of adjoining cells, said negative terminal of each cell being located at the surface thereof immediately adjacent the adjoining cell with which said negative terminal is connected, and sealing material engulfing said terminals, the connected terminals of adjoining cells being laterally and longitudinally spaced from each other to permit ready access of said sealing material between said terminals.

7. A battery in accordance with claim 6 wherein the two terminals of each cell are located on one side of the middle thereof.

8. A battery in accordance with claim 6 wherein the two terminals of each cell are located approximately opposite each other at the opposed faces thereof.

9. A battery comprising a series of juxtaposed flat cells each having a positive terminal and a negative terminal both extending to the top thereof, intercell connectors electrically connecting the opposite terminals of adjoining cells, said connected terminals of adjoining cells being located at the immediately adjacent surfaces of said adjoining cells, and sealing material engulfing said terminals, the connected terminals of adjoining cells being laterally and longitudinally spaced from each other to permit ready access of said sealing material between said terminals.

10. A battery comprising a series of juxtaposed flat cells, each cell having a metallic terminal and a carbon rod terminal both projecting above said cell, intercell connectors integral with said metallic terminals and electrically connecting said cells in series, both terminals in alternate cells in said series being disposed on one side of the middle and both terminals of the remaining alternate cells being disposed on the other side of the middle thereof, the arrangement being such that terminals of adjacent cells connected by said connectors are spaced laterally as well as longitudinally of said battery to provide access to battery sealing material between said terminals.

MILTON EDWARD WILKE.

REFERENCES CITED

The following references are of record in the file of this patent:

UNITED STATES PATENTS

| Number | Name | Date |
| --- | --- | --- |
| 1,087,612 | Simmons | Feb. 17, 1914 |
| 1,255,310 | Henderson | Feb. 5, 1918 |
| 1,631,568 | Yngve | June 7, 1927 |
| 1,651,726 | Osterman | Dec. 6, 1927 |
| 1,732,069 | Schorger | Oct. 15, 1929 |
| 2,307,769 | Deibel | Jan. 12, 1943 |
| 2,480,531 | Wilke | Aug. 30, 1949 |

FOREIGN PATENTS

| Number | Country | Date |
| --- | --- | --- |
| 23,233 | Great Britain | Nov. 28, 1914 |
| 121,683 | Austria | Mar. 10, 1931 |
| 198,572 | Great Britain | June 7, 1923 |
| 279,228 | Great Britain | Oct. 27, 1927 |
| 336,816 | Germany | May 12, 1921 |
| 412,666 | Germany | Apr. 23, 1925 |
| 460,175 | Germany | May 22, 1928 |
| 494,718 | Germany | Apr. 2, 1930 |